US010869328B2

(12) United States Patent
Tang

(10) Patent No.: US 10,869,328 B2
(45) Date of Patent: Dec. 15, 2020

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/494,285

(22) PCT Filed: Mar. 20, 2017

(86) PCT No.: PCT/CN2017/077217
§ 371 (c)(1),
(2) Date: Sep. 14, 2019

(87) PCT Pub. No.: WO2018/170655
PCT Pub. Date: Sep. 27, 2018

(65) Prior Publication Data
US 2020/0077431 A1 Mar. 5, 2020

(51) Int. Cl.
*H04W 72/12* (2009.01)
*H04W 72/06* (2009.01)
*H04W 74/00* (2009.01)

(52) U.S. Cl.
CPC ....... *H04W 72/1278* (2013.01); *H04W 72/06* (2013.01); *H04W 74/004* (2013.01)

(58) Field of Classification Search
CPC ............ H04W 72/1278; H04W 72/06; H04W 74/004
(Continued)

(56) References Cited

U.S. PATENT DOCUMENTS

2017/0034845 A1* 2/2017 Liu .................. H04W 24/08
2018/0139774 A1* 5/2018 Ma .................... H04L 1/189
2018/0302868 A1* 10/2018 Bhorkar ........... H04W 56/0005

FOREIGN PATENT DOCUMENTS

CN 104579547 4/2015
CN 106507497 3/2017
WO 2017011942 1/2017

OTHER PUBLICATIONS

3GPP TSG RAN WG1 meeting #86bis R1-1608919 (Year: 2016).*
(Continued)

*Primary Examiner* — William Nealon
(74) *Attorney, Agent, or Firm* — Hodgson Russ LLP

(57) ABSTRACT

A method for transmitting data comprises: determining, by a first terminal device, that there are first data to be transmitted; transmitting, by the first terminal device, identification information of the first terminal device on a second resource, wherein the identification information of the first terminal device indicates that the first terminal device has data to be transmitted on a first resource which is a grant-free resource dedicated to transmitting data of a plurality of terminal devices including the first terminal device, wherein the second resource is a resource for transmitting identification information of each of at least one terminal device including the first terminal device, wherein the second resource does not overlap with the first resource; transmitting, by the first terminal device, the first data on the first resource.

17 Claims, 4 Drawing Sheets

(58) Field of Classification Search
USPC .................................................... 455/452.1
See application file for complete search history.

(56) References Cited

OTHER PUBLICATIONS

WIPO, ISR for PCT/CN2017/077217, Jun. 30, 2017.
Ericsson, "On Reference Signal Design for Grant-free Access", 3GPP Draft; R1-1700691, 3rd Generation Partnership Project (3GPP), 3GPP TSG RAN WG1 AH_NR Meeting, Jan. 20, 2017.
Ericsson, "On UL grant-free transmission", 3GPP Draft, R1-1701871, 3rd Generation Partnership Project (3GPP), 3GPP TSG-RAN WG1 #88, Feb. 12, 2017.
Schaich, Frank, "Flexible Air iNTerfAce for Scalable service delivery wiThin wireless Communication networks of the 5th Generation (FANTASTIC-5G)", FANTASTIC-5G D3.1, May 30, 2016.
Ericsson, "Aspects for contention based UL transmission in NR", 3GPP Draft, R2-1700431, Aspects for Contention Based UL Transmission in NR, 3rd Generation Partnership Project (3GPP), 3GPP TSG-RAN WG2 NR Ad Hoc, Jan. 17, 2017.
Samsung, "On grant-free UL transmissions for URLLC", 3GPP Draft, R1-1702996, 3rd Generation Partnership Project (3GPP), 3GPP TSG RAN WG1 Meeting #88, Feb. 12, 2017.
European Patent Office, Search Report for EP Application No. 17902563.0, dated Mar. 11, 2020.
EPO, Communication for EP Application No. 17902563.0, dated Oct. 26, 2020.

* cited by examiner

| 300 | Network Device Demodulates Identification Information of First Terminal Device on Second Resource Which Is Resource for Transmitting Identification Information of Each of at Least One Terminal Device Including First Terminal Device | ~310 |

Network Device Determines That First Terminal Device Has Data Transmitted on First Resource If Network Device Has Successfully Demodulated Identifier Information of First Terminal Device, Wherein First Resource Is Dedicated to Transmitting Non-Granted Resource of Data of Plurality of Terminal Devices Including First Terminal Device, Wherein First Resource Does Not Overlap with Second Resource ~320

FIG. 6

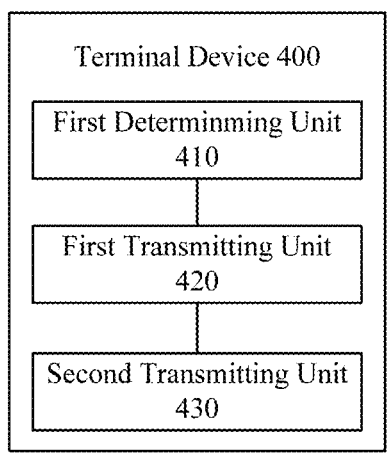

FIG. 7

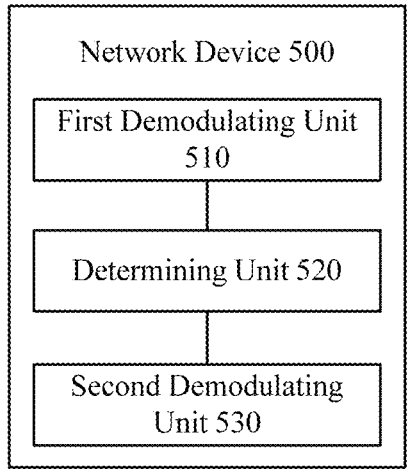

FIG. 8

DATA TRANSMISSION METHOD, TERMINAL DEVICE, AND NETWORK DEVICE

CROSS-REFERENCE TO RELATED APPLICATION

This application is a U.S. national phase application of International Application No. PCT/CN2017/077217, filed Mar. 20, 2017, the entire disclosure of which is incorporated herein by reference.

TECHNICAL FIELD

Embodiments of the present application relate to the field of communication, and more particularly, to a method for transmitting data, a terminal device and a network device.

BACKGROUND

In current communication systems, there is already a transmission mode similar to semi-persistent scheduling, that is, a grant-free transmission mode. A terminal may use these grant-free resources to transmit data to the network in time when data arrive, thereby saving time of requesting for dynamically scheduling a resource for the terminal. The existing resources based on grant-free are usually configured for a plurality of terminal devices, which may cause collisions of contention. The network device cannot timely know the collisions of contention on the grant-free resources, resulting in poor performance of the system.

SUMMARY

In view of this, embodiments of the present application provide a method for transmitting data, a terminal device and a network device.

In a first aspect, there is provided a method for transmitting data, comprising: determining, by a first terminal device, that there are first data to be transmitted; transmitting, by the first terminal device, identification information of the first terminal device on a second resource, wherein the identification information of the first terminal device indicates that the first terminal device has data to be transmitted on a first resource which is a grant-free resource dedicated to transmitting data of a plurality of terminal devices including the first terminal device, wherein the second resource is a resource for transmitting identification information of each of at least one terminal device including the first terminal device, and wherein the second resource does not overlap with the first resource; transmitting, by the first terminal device, the first data on the first resource.

In a second aspect, there is provided a method for transmitting data, comprising: demodulating, by a network device, identification information of a first terminal device on a second resource which is a resource for transmitting identification information of each of at least one terminal device including the first terminal device; determining, by the network device, that the first terminal device has data transmitted on the first resource if the network device has successfully demodulated the identification information of the first terminal device, wherein the first resource is dedicated to transmitting a non-granted resource of data of a plurality of terminal devices including the first terminal device, and wherein the first resource does not overlap with the second resource; demodulating, by the network device, first data transmitted by the first terminal device on the first resource.

In a third aspect, a terminal device is provided, which is used for performing the above methods in the first aspect or any possible implementations thereof. Specifically, the terminal device includes units for performing the above methods in the first aspect or any possible implementations thereof.

In a fourth aspect, a network device is provided, which is used for performing any possible implementations of the above methods in the first aspect or the second aspect. Specifically, the network device includes units for performing the above methods in the second aspect or any possible implementations thereof.

In a fifth aspect, a terminal device is provided, which includes: a memory, a processor, an input interface and an output interface. The memory, the processor, the input interface and the output interface are connected to each other via a bus system. The memory is configured to store instructions, and the processor is configured to execute instructions stored in the memory so as to perform the above methods in the first aspect or any possible implementations thereof.

In a sixth aspect, a network device is provided, which includes a memory, a processor, an input interface and an output interface. The memory, the processor, the input interface and the output interface are connected to each other via a bus system. The memory is configured to store instructions, and the processor is configured to execute instructions stored in the memory so as to perform the above methods in the second aspect or any possible implementations thereof.

In a seventh aspect, a computer storage medium is provided for storing computer software instructions which are used to perform the above methods in the first aspect or any possible implementations thereof or the above methods in the second aspect or any possible implementations thereof, and include programs designed to perform the above aspects.

These and other aspects of the present application will be apparent in the following description of the embodiments.

BRIEF DESCRIPTION OF THE DRAWINGS

FIG. 6 is another schematic block diagram of data transmission in embodiments of the present application.

FIG. 7 is a schematic block diagram of a terminal device for transmitting data in embodiments of the present application.

FIG. 8 is a schematic block diagram of a network device for transmitting data in embodiments of the present application.

DETAILED DESCRIPTION

Figure 1:
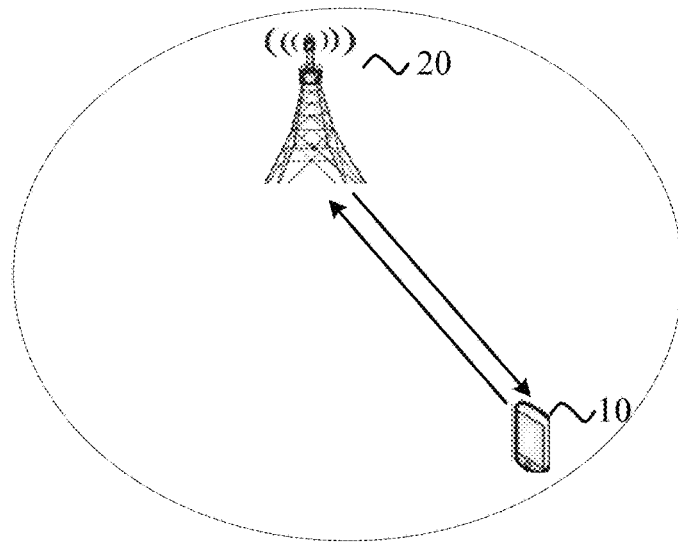
FIG. 1 is a schematic diagram of an application scenario in embodiments of the present application.

The technical solutions in embodiments of the present application will be clearly and completely described in the following with reference to drawings of the embodiments of the present application.

It should be understood that technical solutions of embodiments of the present application may be applied in various kinds of communication systems such as the Global System of Mobile (GSM) communication system, the Code Division Multiple Access (CDMA) system, the Wideband Code Division Multiple Access (WCDMA) system, the General Packet Radio Service (GPRS), the Long Term Evolution (LTE) system, the LTE Frequency Division Duplex (FDD) system, the LTE Time Division Duplex (TDD), the Universal Mobile Telecommunication System (UMTS), the Worldwide Interoperability for Microwave Access (WiMAX) communication system or a future 5G system.

In particular, the technical solutions of the embodiments of the present application may be applied to various communication systems based on non-orthogonal multiple access technology, such as the Sparse Code Multiple Access (SCMA) system, and the Low Density Signature (LDS) system. Certainly, the SCMA system and the LDS system may also be called as other names in the field of communication; further, the technical solutions of the embodiments of the present application may be applied to the multi-carrier transmission system based on non-orthogonal multiple access technology, such as the Orthogonal Frequency Division Multiplexing (OFDM), the Filter Bank Multi-Carrier (FBMC), the Generalized Frequency Division Multiplexing (GFDM), and the Filtered-OFDM (F-OFDM) system.

The terminal device in the embodiments of the present application may refer to a User Equipment (UE), an access terminal, a user unit, a user station, a mobile station, a mobile platform, a remote station, a remote terminal, a mobile device, a user terminal, a terminal, a wireless communication equipment, a user agent or a user device. An access terminal may be a cell phone, a cordless phone, a Session Initiation Protocol (SIP) phone, a Wireless Local Loop (WLL) station, a Personal Digital Assistant (PDA), a hand-held device with a wireless communication function, a computing device or another processing device connected to a wireless modem, a vehicle-mounted device, a wearable device, a terminal device in a future 5G network, a terminal device in a future evolved Public Land Mobile Network (PLMN), or the like. The embodiments of the present application are not limited to this.

The network device in the embodiments of the present application may be a device used to communicate with the terminal device, wherein the network device may be a Base Transceiver Station (BTS) in GSM or CDMA, a NodeB (NB) in a WCDMA system, an Evolutional Node B (eNB or eNodeB) in an LTE system, or a wireless controller in a scenario of Cloud Radio Access Network (CRAN). Alternatively, the network device may be a relay station, an access point, a vehicle-mounted device, a wearable device, a network device in a future 5G network, a network device in in a future evolved Public Land Mobile Network (PLMN), or the like. The embodiments of the present application are not limited to this.

FIG. 1 is a schematic diagram of an application scenario in embodiments of the present application. The communication system in FIG. 1 may include a terminal device 10 and a network device 20. The network device 20 is configured to provide communication services for the terminal device 10 and access the core network. The terminal device 10 accesses the network by searching for synchronous signals, broadcast signals or the like transmitted by the network device 20, so as to communicate with the network. The arrow shown in FIG. 1 may represent uplink/downlink transmission via a cellular link between the terminal device 10 and the network device 20.

Figure 2:
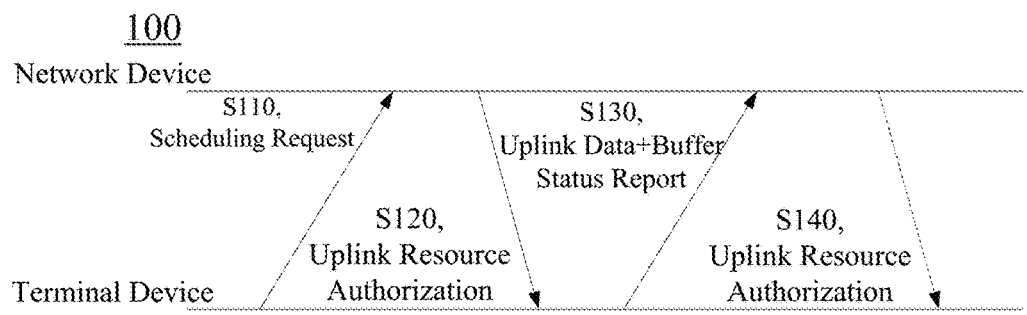
FIG. 2 is a schematic diagram of uplink data transmission mode based on scheduling.

For ease of understanding, the uplink data transmission mode based on scheduling 100 will be briefly described below with reference to FIG. 2. As shown in FIG. 2, the method 100 includes:

At S110, a terminal device initiates a scheduling request (SR), which is used to inform a network device that there are data to be transmitted;

At S120, a network device transmits Downlink Control Information (DCI) on a corresponding Physical Downlink Control Channel (PDCCH) based on the scheduling request of the terminal device, wherein the DCI includes uplink resource authorization;

At S130, the terminal device transmits uplink data in a corresponding uplink resource based on the uplink resource authorization transmitted by the network device, and continues to transmit the buffer status report (BSR) on the data channel if there are residual data in a buffer of the terminal device;

At S140, the network device further issues uplink resource authorization based on the BSR, and so on, until the terminal no longer initiates a request.

Specifically, if there is an event occurred on the side of the terminal device, in which usually the uplink side has data to be transmitted which have already been in the buffer zone, the terminal device needs to apply an uplink resource for these data for transmission. It may transmit a scheduling request through an SR control channel, or through a Physical Random Access Channel (PRACH), in which a scheduling request is transmitted in a manner of contention; following certain scheduling principles, the network device allocates some resources for transmitting BSR information if possible, and informs the terminal device through uplink resource authorization; the terminal device transmits a BSR to inform the network device of how much data to be transmitted through corresponding logical channel group, wherein uplink scheduling is for a logical channel group instead of one radio bearer; then the network device allocates a corresponding resource based on the status of a resource requested by the terminal device, and then informs the terminal device by the uplink resource authorization; the terminal device transmits uplink data based on certain priority principles on its own logical channel.

In the traditional data transmission mode based on the SR, completing one data scheduling usually requires a delay of 7 ms, which is generally unsatisfactory for a service requiring low latency. In addition, this method requires multiple signaling interactions, and the overhead is relatively high.

In current communication systems, there is proposed a grant-free resource. The basic principle is that the network releases some grant-free resources to certain terminals. These resources may be semi-persistently configured by the network. A terminal may use these grant-free resources to transmit data to the network in time when data arrive, thereby saving time of requesting a resource of dynamic scheduling for the terminal. There are two modes to use a grant-free resource:

Dedicated grant-free resource: in this mode, a grant-free resource uniquely corresponds to one terminal, ensuring high reliability of data transmission; for example, the network configures the grant-free resource for a terminal, which is UE1. If the UE1 has data to transmit, the resource can be used immediately. But if the UE1 has no data to transmit, the resource will be wasted.

Grant-free contention based resource: in this mode, a grant-free resource can be configured for a plurality of terminals, and the plurality of terminals perform uplink data transmission through a mechanism of contention. For example, the grant-free resource is configured for UE2 and UE3. The purpose of this is mainly to improve the utilization of grant-free resources, because not every terminal has data to transmit during the configured time of the grant-free resource. However, this mode may cause contention of data transmission among the plurality of terminals.

For this mode of grant-free contention access, if the plurality of terminals transmits data on the configured grant-free resource at the same time, it will cause contention of data transmission due to non-orthogonal transmission of data, resulting in demodulation failure at the receiving end. In order to assist the network in knowing a state of the terminal, the terminal needs to carry a terminal identifier during data transmission. In general, the following centralized demodulating results are available on the network side:

the network has successfully demodulated the terminal identifier and the data transmitted by the terminal. In this case, the network can successfully demodulate the data of all the terminals, but this requires a very complicated receiver algorithm and some coordination mechanism between the terminals at the transmitting end;

the network has successfully demodulated the terminal identifier but cannot demodulate the data transmitted by the terminal. In this case, the network can obtain part of information, such as which terminals have transmitted data on the grant-free, so that further steps can be taken, such as feeding back a ACK/NACK, which enables the terminal that failed in data demodulation to retransmit data in time;

the network has neither successfully demodulated the terminal identifier nor successfully demodulated the data transmitted by the terminal. In this case, the terminal cannot obtain any feedback or further indication from the network side, so the next step cannot be taken.

Figure 3:
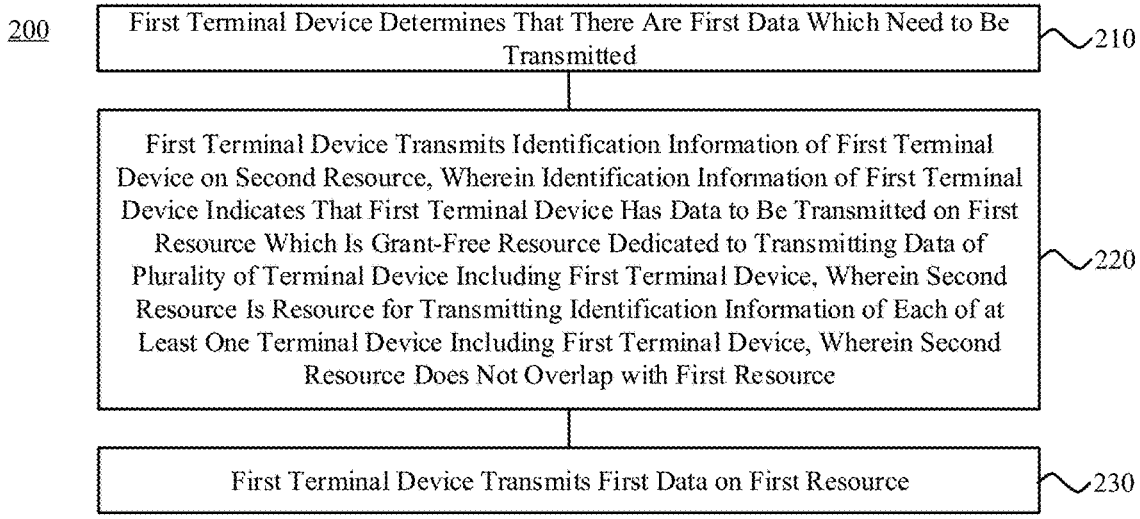
FIG. 3 is a schematic block diagram of data transmission in embodiments of the present application.

FIG. 3 is a schematic block diagram of a method 200 for transmitting data in embodiments of the present application. As shown in FIG. 3, the method 200 includes:

At S210, a first terminal device determines that there are first data to be transmitted;

At S220, the first terminal device transmits identification information of the first terminal device on a second resource, wherein the identification information of the first terminal device indicates that the first terminal device has data to be transmitted on a first resource which is a grant-free resource dedicated to transmitting data of a plurality of terminal devices including the first terminal device, wherein the second resource is a resource for transmitting identification information of each of at least one terminal device including the first terminal device, and wherein the second resource does not overlap with the first resource;

At S230, the first terminal device transmits the first data on the first resource.

It should be noted that the network device may configure a resource for transmitting data for a plurality of terminal devices in advance, wherein the resource is a grant-free resource. That is to say, the terminal device does not need to initiate a scheduling request to request for a resource if there are data to be transmitted in time domain of the resource, and it can directly use the resource to transmit data. The grant-free resource may also be a fixed resource specified by a protocol. In other words, the grant-free resource is configured in a persistent or semi-persistent manner. Similarly, the resource for transmitting identification information of the terminal device is also configured in a persistent or semi-persistent manner.

Specifically, the two non-overlapping resources are configured to respectively transmit grant-free data and identification information of a terminal device, wherein the identification information of the terminal device indicates that data are transmitted on the grant-free resource. For example, if the network device uses a time slot as a scheduling unit, the network device can configure the previous symbol of one time slot for transmitting identification information of a plurality of terminal devices, and the second and third symbols are used for transmitting grant-free data of the plurality of terminal devices. If the terminal device just has data before the time slot, the terminal device can directly transmit its identification information on the first symbol of the time slot, and transmit buffered data on the second and third symbols of the time slot. If there is no special illustration, the first terminal device has the right to use both the two resources configured here, that is to say, the plurality of terminal devices involved in the two resources above include the first terminal device. Since the grant-free resource is a contention resource, that is, there may be a plurality of terminal devices transmitting data on the grant-free resource, then the data of the plurality of terminal devices may have collision and the network device may fail to demodulate the data. If the network device just demodulates the identification information of the first terminal device, the network device may at least know that the first terminal device transmits data on the grant-free resource. In this way, without demodulating the data, the network device may further feed back a NACK to the first terminal device or directly allocate a resource for retransmission for the data which cannot be demodulated.

Therefore, the method for transmitting data in the embodiments of the present application is helpful for the network device to demodulate the identification information of the terminal device, so that the network device can know the collisions of contention, and perform further operation.

Optionally, in the embodiments of the present application, the method further includes: transmitting, by the first terminal device, at least one of a buffer status report (BSR), a resource change request and second data to be transmitted of the first terminal device on the second resource, wherein the resource change request is used to request the network device to adjust a second resource in a next scheduling unit, and wherein data volume of the second data is less than a first threshold.

The second resource may transmit other information of the terminal device in addition to the identification information of the terminal device. For example, the other information may be a buffer status report of the terminal device, that is, if the first resource is insufficient to transmit data buffered by the terminal device, the terminal device may further carry a buffer status report of the terminal device on the second resource and inform the network device of how many data needs to be transmitted by the terminal device, then the network device may allocate a resource for data volume in the buffer status report. The other information may also be a resource change request, that is, the terminal device may actively request the network device to change the size, location, and type of the second resource. Specifically, if the resource required for the other information transmitted by the terminal device on the second resource are relatively large, which the size of the second resource cannot satisfy, then the terminal device may request the network device that the second resource may be configured to be larger. If the second resource is originally a contention resource, the terminal device may further request the network device to configure the second resource as a resource dedicated to the terminal device in the next scheduling unit. The terminal device may determine to request for specifically changing what of the second resource using the resource change request based on its own need. The other information may also be some small data volume of the terminal device, usually some data volumes less than a certain threshold, for example, which may be several bytes of data. The terminal device may find that the second resource has redundancy after uploading its identification information, BSR or resource change request, and may use the redundant resource to transmit some small data.

Optionally, in the embodiments of the present application, before the first terminal device transmits identification information of the first terminal device on a second resource, the method further includes: receiving, by the first terminal device, indicating information transmitted by the network device, wherein the indicating information indicates size and location of the second resource; determining, by the first terminal device, the second resource based on the indicating information.

As mentioned above, the size, location and type of the second resource may be adjusted. For example, it may be dynamically adjusted through a signaling of a higher layer such as Radio Resource Control (RRC) or Downlink Control Information (DCI). In other words, the location, size, and type of the second resource in different scheduling units may vary, and the configured terminal of the second resource may also change. For example, the second resource is configured for the UE1 to the UE4 in the previous scheduling unit, and it may be configured for the UE2 to the UE5 in the next scheduling unit. The resource configured for the UE1 may be in other location. The adjustment of the second resource may be requested by the terminal device, and then the network device transmits a response, wherein the response is the foregoing indicating information, and the network device may also actively adjust the second resource. For example, the network has not successfully demodulated information of a terminal on a first resource and a second resource, a possible reason of which is that both identification information and data are in conflict. In the next scheduling unit, the network can adjust the usage mode of the second resource, that is, to configure a dedicated second resource for the terminal, so as to improve reliability of the transmission of at least the identification information of the terminal device. Conversely, for example, when the network can easily demodulate the identification information of the terminal, the network can consider that the configured second resource may be relatively redundant. So that in the next transmission, the network can configure a second resource of contention type for the terminal, that is, configure a same second resource for a plurality of terminals. In summary, in this embodiment, by adjusting the second resource, a balance between resource utilization and collision conflicts can be reached, thereby improving performance of the system.

It should be understood that the first resource may also be adjusted in the size and location in a next scheduling unit by using indicating information. The indicating information indicating the first resource and the indicating information indicating the second resource may be carried in one message, or may be respectively carried in two messages. The embodiments of the present application are not limited thereto. The configuration mode of the first resource is similar to that of the second resource. For brevity, it will not be repeated herein.

The identification information of the terminal device may include a Cell-Radio Network Temporary Identifier (C-RNTI) of Medium Access Control (MAC) layer of the terminal device or an identifier in RRC inactive state. In the New Radio (NR) system, the terminal device has another state between RRC idle state and RRC connected state. In such state, there are still some radio bearers, core networks, base stations, and terminals, which retain corresponding context, and a base station will allocate an access network identifier to the terminal, wherein the access network identifier may be a radio resource control recovery identifier RRC-RESUME-ID or an access stratum (AS) context identifier AS-CONTEXT-ID. In the inactive state, the terminal device may have mobility of cell reselection but no measurement report, and transmission and reception of small data may be performed.

Optionally, in the embodiments of the present application, the second resource may be a resource on a data channel configured by a network device, or may be a resource on a random access channel or a resource on a control channel.

Further, if the second resource is a resource on a data channel, the second resource configured by the network device may also be used to transmit data based on scheduling of other terminal devices. For example, originally, the identification information of the UE1 configured by the network device may be transmitted on a resource block 1, while the UE2 transmits a scheduling request to the network device and the resource block which is allocated by the network device to the UE2 just covers the resource block 1, then the resource block 1 may also be used to transmit scheduling data of the UE2.

If the network device configures a random access channel RACH as the second resource, the network device may uniquely configure a preamble sequence for the terminal device. In this case, the terminal device may take a preamble sequence corresponding thereto as a terminal identifier. That is, after receiving a random access preamble sequence, the network device can uniquely determine which terminal device has transmitted grant-free data on the first resource.

If the network device configures an uplink control channel as the second resource, the network device may configure a resource of an uplink control channel in the time domain of the first resource as the second resource. For example, if the terminal device has data to be transmitted within the time domain of the first resource, the terminal device transmits a scheduling request to the network device. The scheduling request of each of the terminal devices is unique, that is, the network device may uniquely determine the terminal device after receiving the scheduling request. Thus, the terminal device may directly transmit at least part of buffered data on the first resource when initiating a scheduling request to the network device, and the network device may determine that there are data transmitted by the terminal device corresponding to the scheduling request on the first resource after receiving the scheduling request. Then, the network device can demodulate the data transmitted by the terminal device on the first resource.

Optionally, in the embodiments of the present application, the network device may directly configure the first resource and the second resource. For example, the network device may directly configure a plurality of small resource blocks, and the terminal device may select one of the blocks to inform the network device, so that the terminal device transmits grant-free data on the block of resource. The network device may also inform the terminal device of several resource blocks which have been configured. When there are data, the terminal device may select which resource block to use to transmit grant-free data.

For a person skilled in the art, the network device may also directly configure a region of the grant-free resource to directly transmit grant-free data of a plurality of terminal devices under the network device. The network device may divide a plurality of small resource blocks in the region, classify content of transmission of the plurality of terminal devices, or group the plurality of terminal devices.

A specific implementation of the embodiments of the present application in the cases where the region of the grant-free resource is configured will be described in detail below with reference to FIG. 4 and FIG. 5.

The network device may first configure a region of a grant-free resource, and then divide several small resource blocks in the region of the grant-free resource. Specifically, a resource for transmitting grant-free data and a resource for transmitting identification information may be both in the region of the grant-free resource. As shown in FIGS. 4 and 5, small resource blocks are divided in the region of the grant-free resource, wherein one resource block is dedicated to transmitting grant-free data of the UE1, that is, the resource block is a dedicated grant-free resource block; one resource block is dedicated to transmitting grant-free data of the UE2 and the UE3 and one resource block is dedicated to transmitting grant-free data of the UE4 and the UE5, that is to say, these two resource blocks are grant-free contention resource blocks; FIG. 4 also shows that the other two resource blocks are respectively used to transmit identification information of the UE2 and the UE4, that is, these two resource blocks may dedicatedly transmit information of the UE2 and the UE4. The network device may also configure a dedicated resource block for transmitting information of the UE3 and the UE5. In summary, in this embodiment, the second resource configured by the network device for the terminal device is a resource block which is dedicated to the terminal device.

Figure 5:
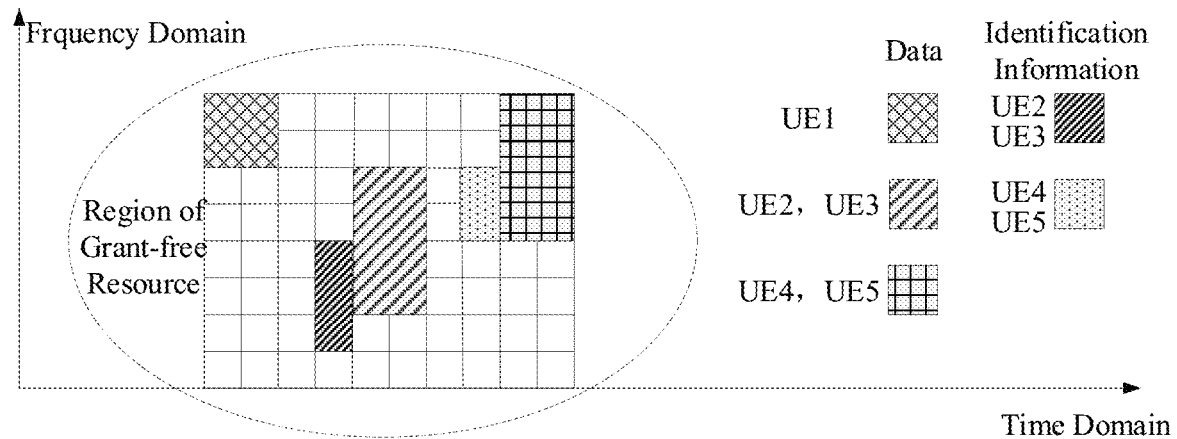
FIG. 5 is another schematic diagram of resource configuration in embodiments of the present application.

As shown in FIG. 5, similarly, 5 small resource blocks are divided in the region of the grant-free resource, wherein one resource block is dedicated to transmitting grant-free data of the UE1, that is, the resource block is a dedicated grant-free resource block; one resource block is dedicated to transmitting grant-free data of the UE2 and the UE3 and one resource block is dedicated to transmitting grant-free data of the UE4 and the UE5, that is to say, these two resource blocks are grant-free contention resource blocks; FIG. 5 also shows that the other two resource blocks are respectively used to transmit identification information of the UE2, the UE3 and the UE4, the UE5, that is, these two resource blocks may also transmit information of the UE2, the UE3 and the UE4, the UE5 in a contention mode. In summary, in this embodiment, the second resources configured by the network device for the terminal device all are resource blocks that is competed by the plurality of terminal devices.

In the case that the network device has configured a region of the grant-free resource, the second resource may be configured outside the region of the grant-free resource. Similarly, the second resource may be configured as a dedicated resource or a contention resource. The specific configuration mode can be as shown in FIG. 4 and FIG. 5, except that the second resource is a resource outside a region of the grant-free resource.

It should be understood that the first resource of the foregoing configuration and the terminal device of the second resource do not necessarily have a one-to-one correspondence. For example, if the first resource is configured as a resource for the UE1 to the UE4 to transmit grant-free data, the second resource may be configured as a resource for the UE1 to the UE4 to transmit identification information, or the second resource may also be configured as a resource for the UE2 and the UE3 to transmit identification information. The UE1 and the UE4 may be configured to transmit identification information in other location, and the second resource may also be configured to serve the UE2 to the UE5, wherein the UE2 and the UE4 may transmit identification information on this second resource and the UE5 may transmit scheduling or grant-free data on this second resource. The embodiments of the present application are not limited thereto.

In the embodiments of the present application, according to the configuration of the network device, the terminal device respectively transmits the grant-free data of the terminal device, the identification information of the terminal, and other information of the terminal mainly in the following cases:

The terminal may transmit uplink data, identification information of the terminal and other information on the first resource;

The terminal transmits uplink data and other information on the first resource, and transmits identification information of the terminal on the second resource;

The terminal transmits uplink data on the first resource, and transmits identification information of the terminal and other information on the second resource.

Therefore, in regard to the method for transmitting data of the embodiments of the present application, since the identification information of the terminal device and its grant-free data are respectively transmitted on resources, it can help the network device with demodulating the identification information of the terminal device, thereby performing further operations, and thereby improving performance of the system.

FIG. 6 is a schematic block diagram of a method 300 for transmitting data in the embodiments of the present application. As shown in FIG. 6, the method 300 includes:

At S310, a network device demodulates identification information of a first terminal device on a second resource which is a resource for transmitting identification information of each of at least one terminal device including the first terminal device;

At S320, the network device determines that the first terminal device has data transmitted on the first resource if the network device has successfully demodulated the identification information of the first terminal device, wherein the first resource is a non-granted resource dedicated to transmitting data of a plurality of terminal devices including the first terminal device, and wherein the first resource does not overlap with the second resource;

At S330, the network device demodulates first data transmitted by the first terminal device on the first resource.

Optionally, in embodiments of the present application, the first resource is a resource for transmitting data, which is semi-statically configured by the network device for the plurality of terminal devices, and/or the second resource is a resource for transmitting the identification information of each of the at least one terminal device, which is semi-statically configured by the network device.

Optionally, in embodiments of the present application, the method further includes: feeding back, by the network device, a NACK to the first terminal device and/or allocating, by the network device, a resource to the first terminal device for retransmitting the first data, if the network device has successfully demodulated the identification information of the first terminal device and failed to demodulate the first data.

Specifically, the network side demodulates data at locations of a corresponding second resource and of a corresponding first resource, and if terminal identification information is successfully demodulated at the location of the second resource, determines that the terminal has data transmitted on the first resource. If demodulation of the data of the terminal fails on the first resource, the network may feed back a NACK or schedule a dedicated resource for the terminal to perform further data retransmission.

Optionally, in embodiments of the present application, the method further includes: demodulating, by the network device, at least one of a buffer status report (BSR), a resource change request and second data to be transmitted of the first terminal device on the second resource, wherein the resource change request is used to request the network device to adjust a second resource in a next scheduling unit, and wherein data volume of the second data is less than a first threshold.

Optionally, in embodiments of the present application, before the network device demodulates identification information of the first terminal device on the second resource, the method further includes: transmitting, by the network device, indicating information to the first terminal device, wherein the indicating information indicates size and location of the second resource.

Optionally, in embodiments of the present application, the indicating information is carried in a radio resource control (RRC) signaling or downlink control information (DCI).

Optionally, in embodiments of the present application, the identification information of the first terminal device comprises a cell radio network temporary identifier (C-RNTI), a radio resource control resume identifier (RRC-RESUME-ID) or an access network context identifier (AS-CONTEXT-ID) of the first terminal device.

Optionally, in embodiments of the present application, the second resource is a resource on a random access channel, wherein the identification information of the first terminal device is a dedicated preamble sequence of the first terminal device.

Optionally, in embodiments of the present application, the second resource is a resource on a control channel, wherein the identification information of the first terminal device is a scheduling request of the first terminal device, wherein the scheduling request is used to request the network device to allocate a resource to third data to be transmitted of the first terminal device.

Optionally, in embodiments of the present application, the method further includes: demodulating data based on scheduling transmitted by a second terminal device on the second resource.

Therefore, in regard to the method for transmitting data of the embodiments of the present application, since the identification information of the terminal device and its grant-free data are respectively transmitted on resources, it can help the network device with demodulating the identification information of the terminal device, thereby performing further operations, and thereby improving performance of the system.

It should be understood that interactions between the network device and the terminal device, related characteristics and functions described at the network device correspond to related characteristics and functions of the terminal device. That is to say, what information the terminal device transmits to the network device, and what information the network device will receive accordingly. For brevity, it will not be covered again herein.

It should also be understood that, in the embodiments of the present application, the sizes of the serial numbers of the above-mentioned processes do not imply the order of execution, and the order of execution of each process should be determined by its function and internal logic, without any limitation on the implementation process of the embodiments of the present application.

FIG. 7 is a schematic block diagram of a terminal device 400 for transmitting data of the embodiments of the present application. As shown in FIG. 7, the terminal device 400 includes:

a first determining unit 410, configured to determine that there are first data to be transmitted;

a first transmitting unit 420, configured to transmit identification information of the first terminal device on a second resource, wherein the identification information of the first terminal device indicates that the first terminal device has data to be transmitted on a first resource which is a grant-free resource dedicated to transmitting data of a plurality of terminal devices including the first terminal device, wherein the second resource is a resource for transmitting identification information of each of at least one terminal device including the first terminal device, and wherein the second resource does not overlap with the first resource;

a second transmitting unit 430, configured to transmit the first data on the first resource.

Therefore, in regard to the terminal device for transmitting data of the embodiments of the present application, since the identification information of the terminal device and its grant-free data are respectively transmitted on resources, it can help the network device with demodulating the identification information of the terminal device, thereby performing further operations, and thereby improving performance of the system.

Optionally, in the embodiments of the present application, the first resource is a resource for transmitting data, which is semi-statically configured by a network device for the plurality of terminal devices, and/or the second resource is a resource for transmitting the identification information of each of the at least one terminal device, which is semi-statically configured by the network device.

Optionally, in the embodiments of the present application, the terminal device 400 further includes: a third transmitting unit 440, configured to transmit at least one of a buffer status report (BSR), a resource change request and second data to be transmitted of the first terminal device on the second resource, wherein the resource change request is used to request the network device to adjust a second resource in a next scheduling unit, and wherein data volume of the second data is less than a first threshold.

Optionally, in the embodiments of the present application, the terminal device 400 further includes: a receiving unit 450, configured to receive indicating information transmitted by the network device, wherein the indicating information indicates size and location of the second resource; a second determining unit 460, configured to determine the second resource based on the indicating information.

Optionally, in the embodiments of the present application, the indicating information is carried in a radio resource control (RRC) signaling or downlink control information (DCI).

Optionally, in the embodiments of the present application, the identification information of the first terminal device comprises a cell radio network temporary identifier (C-RNTI), a radio resource control resume identifier (RRC-RESUME-ID), an access network context identifier (AS-CONTEXT-ID) of the first terminal device.

Optionally, in the embodiments of the present application, the second resource is a resource on a random access channel, wherein the identification information of the first terminal device is a dedicated preamble sequence of the first terminal device.

Optionally, in the embodiments of the present application, the second resource is a resource on a control channel, wherein the identification information of the first terminal device is a scheduling request of the first terminal device, wherein the scheduling request is used to request the network device to allocate a resource to third data to be transmitted of the first terminal device.

Optionally, in the embodiments of the present application, the second resource is further used to transmit data based on dynamic scheduling of a second terminal device.

Figure 4:
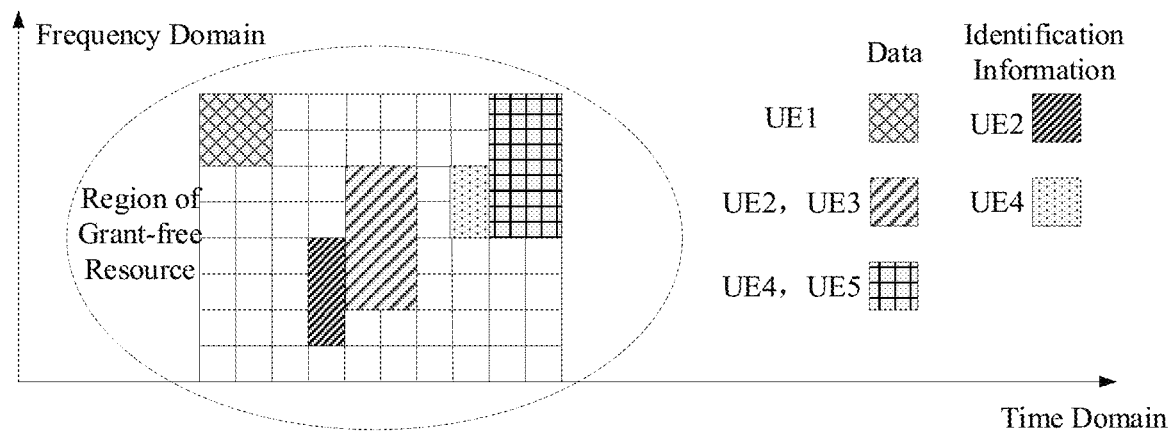
FIG. 4 is a schematic block diagram of resource configuration in embodiments of the present application.

It should be understood that the terminal device 400 for transmitting data according to the embodiments of the present application may correspond to the terminal device in the embodiments of the method of the present application, and the foregoing and other operations and/or functions of each unit in the terminal device 400 are to respectively implement corresponding processes of the terminal device in the methods 200 shown in FIG. 3 to FIG. 5. For brevity, it will not be covered again herein.

FIG. 8 is a schematic block diagram of a network device 500 for transmitting data of embodiments of the present application. As shown in FIG. 8, the network device 500 includes:

a first demodulating unit 510, configured to demodulate identification information of a first terminal device on a second resource which is a resource for transmitting identification information of each of at least one terminal device including the first terminal device;

a determining unit 520, configured to determine that the first terminal device has data transmitted on the first resource if the network device has successfully demodulated the identification information of the first terminal device, wherein the first resource is a non-granted resource dedicated to transmitting data of a plurality of terminal devices including the first terminal device, and wherein the first resource does not overlap with the second resource;

a second demodulating unit 530, configured to demodulate first data transmitted by the first terminal device on the first resource.

Therefore, in regard to the network device for transmitting data of the embodiments of the present application, since the identification information of the terminal device and its grant-free data are respectively transmitted on resources, it can help the network device with demodulating the identification information of the terminal device, thereby performing further operations, and thereby improving performance of the system.

Optionally, in the embodiments of the present application, the first resource is a resource for transmitting data, which is semi-statically configured by the network device for the plurality of terminal devices, and/or the second resource is a resource for transmitting the identification information of each of the at least one terminal device, which is semi-statically configured by the network device.

Optionally, in the embodiments of the present application, the network device 500 further includes: a processing unit 540, configured to feed back a NACK to the first terminal device and/or allocate a resource to the first terminal device for retransmitting the first data, if the first demodulating unit has successfully demodulated the identification information of the first terminal device and the second demodulating unit has failed to demodulate the first data.

Optionally, in the embodiments of the present application, the network device 500 further includes: a third demodulating unit 550, configured to demodulate at least one of a buffer status report (BSR), a resource change request and second data to be transmitted of the first terminal device on the second resource, wherein the resource change request is used to request the network device to adjust a second resource in a next scheduling unit, and wherein data volume of the second data is less than a first threshold.

Optionally, in the embodiments of the present application, the network device 500 further includes: a transmitting unit 560, configured to transmit indicating information to the first terminal device, wherein the indicating information indicates size and location of the second resource.

Optionally, in the embodiments of the present application, the indicating information is carried in a radio resource control (RRC) signaling or downlink control information (DCI).

Optionally, in embodiments of the present application, the identification information of the first terminal device comprises a cell radio network temporary identifier (C-RNTI), a radio resource control resume identifier (RRC-RESUME-ID) or an access network context identifier (AS-CONTEXT-ID) of the first terminal device.

Optionally, in the embodiments of the present application, the second resource is a resource on a random access channel, wherein the identification information of the first terminal device is a dedicated preamble sequence of the first terminal device.

Optionally, in the embodiments of the present application, the second resource is a resource on a control channel, wherein the identification information of the first terminal device is a scheduling request of the first terminal device, wherein the scheduling request is used to request the network device to allocate a resource to third data to be transmitted of the first terminal device.

Optionally, in the embodiments of the present application, the network device 500 further includes: a fourth demodulating unit 570, configured to demodulate data based on scheduling transmitted by a second terminal device on the second resource.

It should be understood that the network device 500 for transmitting data according to the embodiments of the present application may correspond to the network device in the embodiments of the method of the present application, and the foregoing and other operations and/or functions of each unit in the network device 500 are to respectively implement corresponding processes of the network device in the method 300 shown in FIG. 6. For brevity, it will not be covered again herein.

Figure 9:
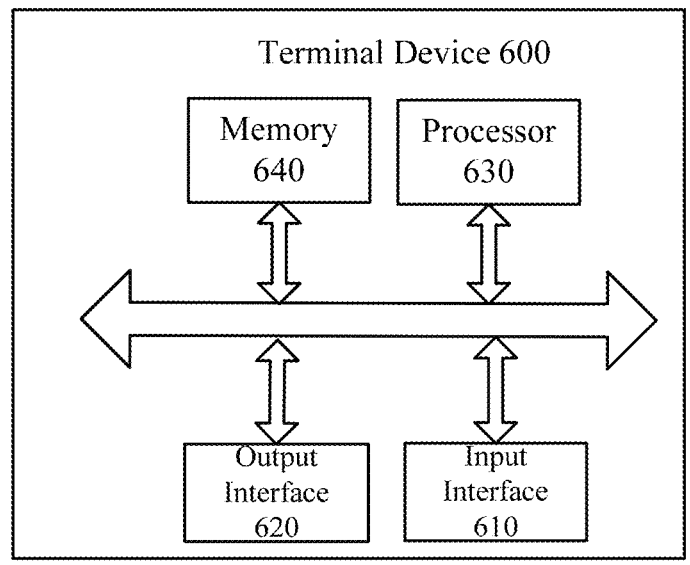
FIG. 9 is another schematic block diagram of a terminal device for transmitting data in embodiments of the present application.

As shown in FIG. 9, the embodiments of the present application also provide a terminal device 600 for transmitting data. The terminal device 600 may be the terminal device 400 in FIG. 5, which can be used to perform the content of the terminal device corresponding to the method 100 in FIG. 3. The terminal device 600 includes: an input interface 610, an output interface 620, a processor 630 and a memory 640, wherein the input interface 610, the output interface 620, the processor 630 and the memory 640 may be connected with each other through a bus system. The memory 640 is configured to store programs, instructions or codes. The processor 630 is configured to execute programs, instructions or codes in the memory 640 to control the input interface 610 to receive signals, to control the output interface 620 to transmit signals, and to complete the operation in the embodiments of the method described above.

Therefore, in regard to the terminal device for transmitting data of the embodiments of the present application, since the identification information of the terminal device and its grant-free data are respectively transmitted on resources, it can help the network device with demodulating the identification information of the terminal device, thereby performing further operations, and thereby improving performance of the system.

It should be understood that in the embodiments of the present application, the processor 630 may be a Central Processing Unit (CPU). The processor 630 may also be another general-purpose processor, a Digital Signal Processor, an Application Specific Integrated Circuit, a Field Programmable Gate Array or other programmable logic device, discrete gate or transistor logic device, discrete hardware component and etc. A general-purpose processor can be a microprocessor or the processor can be any conventional processor and the like.

The memory 640 may include a read-only memory and a random access memory, and provide instructions and data to the processor 630. A portion of the memory 640 may also include a nonvolatile random access memory. For example, the memory 640 can also store information about device types.

In the process of implementation, the content of the above method can be implemented by integrated logic circuit of hardware in the processor 630 or instructions in the form of software. The content with reference to the method disclosed in the embodiments of the present application may be directly implemented to be performed by a hardware processor, or may be performed by a combination of hardware and software modules in the processor. Software modules can be located in a developed storage medium in this field, such as a random access memory, a flash memory, a read-only memory, a programmable read-only memory or an electrical erasable programmable memory, a register. The storage medium is located in the memory 640, and the processor 630 reads the information in the memory 640 and completes the content of the above method with its hardware. To avoid repetition, it will not be described in detail herein.

In a specific implementation, the receiving unit 450 in the terminal device 400 can be implemented by the input interface 610 in FIG. 9. The first transmitting unit 420, the second transmitting unit 430 and the third transmitting unit 440 in the terminal device 400 can be implemented by the output interface 620 in FIG. 9. The first determining unit 410 and the second determining unit 460 can be implemented by the processor 630 in FIG. 9.

Figure 10:
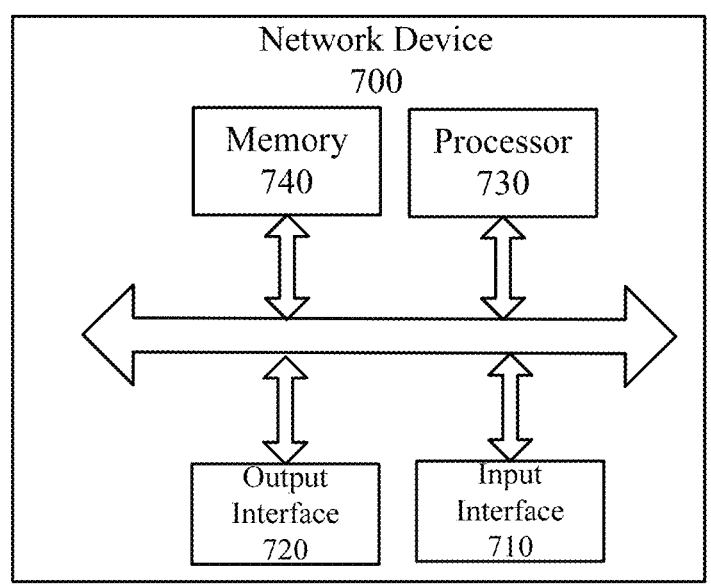
FIG. 10 is another schematic block diagram of a network device for transmitting data in embodiments of the present application.

As shown in FIG. 10, the embodiments of the present application also provide a network device 700 for transmitting data, wherein the network device 700 may be the network device 500 in FIG. 8, which can be used to perform the content of the network device corresponding to the method 300 in FIG. 6. The network device 700 includes: an input interface 710, an output interface 720, a processor 730 and a memory 740, wherein the input interface 710, the output interface 720, the processor 730 and the memory 740 can be connected with each other through a bus system. The memory 740 is configured to store programs, instructions or codes. The processor 730 is configured to execute programs, instructions or codes in the memory 740 to control the input interface 710 to receive signals, to control the output interface 720 to transmit signals, and to complete the operations in the embodiments of the method described above.

Therefore, in regard to the network device for transmitting data of the embodiments of the present application, since the identification information of the terminal device and its grant-free data are respectively transmitted on a resource, it can help the network device with demodulating the identification information of the terminal device, thereby performing further operations, thereby improving performance of the system.

It should be understood that in the embodiments of the present application, the processor 730 may be a Central Processing Unit (CPU). The processor 730 may also be another general-purpose processor, a Digital Signal Processor, an Application Specific Integrated Circuit, a Field Programmable Gate Array or other programmable logic device, discrete gate or transistor logic device, discrete hardware component and etc. A general-purpose processor can be a microprocessor or the processor can be any conventional processor and the like.

The memory 740 may include a read-only memory and a random access memory, and provide instructions and data to the processor 730. A portion of the memory 740 may also include a nonvolatile random access memory. For example, the memory 740 may also store information about device types.

In the process of implementation, the content of the above method can be implemented by integrated logic circuit of hardware in the processor 730 or instructions in the form of software. The content with reference to the method disclosed in the embodiments of the present application may be directly implemented to be performed by a hardware processor, or may be performed by a combination of hardware and software modules in the processor. Software modules can be located in a developed storage medium in this field, such as a random access memory, a flash memory, a read-only memory, a programmable read-only memory or an electrical erasable programmable memory, a register. The storage medium is located in the memory 740, and the processor 730 reads the information in the memory 740 and completes the content of the above method with its hardware. To avoid repetition, it will not be described in detail herein.

In a specific implementation, the first demodulating unit 510, the determining unit 520, the second demodulating unit 530, the processing unit 540, the third demodulating unit 550, and the fourth demodulating unit 570 in the network device 500 may be implemented by the processor 730 in FIG. 10. The transmitting unit 560 may be implemented by the output interface 720 in FIG. 10.

It may be realized by an ordinary person skilled in the art that various units and algorithm steps of various examples described in conjunction with the embodiments disclosed herein may be implemented in electronic hardware, or a combination of electronic hardware and computer software. Whether these functions are implemented in hardware or software depends on specific applications and design constraints of technical solutions. A person skilled in the art may implement the described functions with different methods for each of specific applications, but such implementations shall not be regarded as going beyond the scope of the present application.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present application, it should be understood that the disclosed systems, devices and methods may be implemented by other means. For example, the device embodiments described above are merely schematic. For example, the partitioning of the units is merely a partitioning in logical function. There may be other manners for partitioning in actual implementation. For example, multiple units or components may be combined together or integrated into another system, or some features can be omitted or not be executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual requires to achieve the purposes of the solutions of the embodiments of the present application.

In addition, each functional unit in each embodiment of the present application may be integrated into one processing unit, or each unit exists independently in physics, or two or more units may be integrated into one unit.

The functions, if implemented in the form of software functional units and sold or used as a standalone product, may be stored in a computer-readable storage medium. Based on such an understanding, the technical solution of the present application in essence, or the part that contributes to the prior art, or all or part of the technical solution, may be embodied in the form of a software product. The computer software product is stored in a storage medium and includes a plurality of instructions for a computer device (which may be a personal computer, a server, a network device or the like) to execute all or part of the steps of the method described in the embodiments of the present application. The foregoing storage medium includes various media that may store program code, such as a USB flash disk, a mobile hard disk, a Read-Only Memory (ROM), a Random Access Memory (RAM), a magnetic disk, an optical disk.

The above description is merely a specific implementation mode of the present application, but the scope of protection of the present application is not limited to this. Any modification or replacement that would be readily conceived by any person skilled in the art within the scope of the technology disclosed in the present application should be within the scope of protection of the present application. Therefore, the scope of protection of the present application shall be defined by the claims.

What is claimed is:

1. A method for transmitting data, comprising:
   determining, by a first terminal device, that there are first data to be transmitted;
   transmitting, by the first terminal device, identification information of the first terminal device on a second resource, wherein the identification information of the first terminal device indicates that the first terminal device has data to be transmitted on a first resource which is a grant-free resource dedicated to transmitting data of a plurality of terminal devices including the first terminal device, wherein the second resource is a resource for transmitting identification information of each of at least one terminal device including the first terminal device, wherein the second resource does not overlap with the first resource; and
   transmitting, by the first terminal device, the first data on the first resource;
   wherein the second resource is a resource on a random access channel, wherein the identification information of the first terminal device is a dedicated preamble sequence of the first terminal device.

2. The method according to claim 1, comprising at least one of the following:
   the first resource is a resource for transmitting data, which is semi-statically configured by a network device for the plurality of terminal devices; and
   the second resource is a resource for transmitting the identification information of each of the at least one terminal device, which is semi-statically configured by the network device.

3. The method according to claim 1, further comprising:
   transmitting, by the first terminal device, at least one of a buffer status report (BSR), a resource change request and second data to be transmitted of the first terminal device on the second resource, wherein the resource change request is used to request a network device to adjust a second resource in a next scheduling unit, and wherein data volume of the second data is less than a first threshold.

4. The method according to claim 1, wherein before transmitting, by the first terminal device, identification information of the first terminal device on a second resource, the method further comprises:
   receiving, by the first terminal device, indicating information transmitted by a network device, wherein the indicating information indicates size and location of the second resource;
   determining, by the first terminal device, the second resource based on the indicating information.

5. The method according to claim 1, wherein the second resource further comprises a resource on a control channel, wherein the identification information of the first terminal device further comprises a scheduling request of the first terminal device, which is used to request a network device to allocate a resource to third data to be transmitted of the first terminal device.

6. The method according to claim 1, wherein the second resource is further used to transmit data based on dynamic scheduling of a second terminal device.

7. A method for transmitting data, comprising:
   demodulating, by a network device, identification information of a first terminal device on a second resource which is a resource for transmitting identification information of each of at least one terminal device including the first terminal device;
   determining, by the network device, that the first terminal device has data transmitted on the first resource if the network device has successfully demodulated the identification information of the first terminal device, wherein the first resource is a non-granted resource dedicated to transmitting data of a plurality of terminal devices including the first terminal device, and wherein the first resource does not overlap with the second resource; and demodulating, by the network device, first data transmitted by the first terminal device on the first resource;

wherein the second resource is a resource on a random access channel, wherein the identification information of the first terminal device is a dedicated preamble sequence of the first terminal device.

8. The method according to claim 7, comprising at least one of the following:

the first resource is a resource for transmitting data, which is semi-statically configured by the network device for the plurality of terminal devices; and the second resource is a resource for transmitting the identification information of each of the at least one terminal device, which is semi-statically configured by the network device.

9. The method according to claim 7, further comprising at least one of the following:

feeding back, by the network device, a NACK to the first terminal device; and allocating, by the network device, a resource to the first terminal device for retransmitting the first data, if the network device has successfully demodulated the identification information of the first terminal device and failed to demodulate the first data.

10. The method according to claim 7, further comprising:

demodulating, by the network device, at least one of a buffer status report (BSR), a resource change request and second data to be transmitted of the first terminal device on the second resource, wherein the resource change request is used to request the network device to adjust a second resource in a next scheduling unit, and wherein data volume of the second data is less than a first threshold.

11. The method of claim 7, wherein before demodulating, by the network device, the identification information of the first terminal device on a second resource, the method further comprises:

transmitting, by the network device, indicating information to the first terminal device, wherein the indicating information indicates size and location of the second resource.

12. The method according to claim 7, wherein the second resource further comprises a resource on a control channel, wherein the identification information of the first terminal device further comprises a scheduling request of the first terminal device, which is used to request the network device to allocate a resource to third data to be transmitted of the first terminal device.

13. A terminal device for transmitting data, wherein the terminal device is a first terminal device, and comprises a memory, a processor, an input interface and an output interface which are connected to each other via a bus system, wherein the memory is configured to store instructions, and the processor is configured to execute the instructions stored in the memory so as to perform a method for transmitting data comprising:

determining, by the first terminal device, that there are first data to be transmitted;

transmitting, by the first terminal device, identification information of the first terminal device on a second resource, wherein the identification information of the first terminal device indicates that the first terminal device has data to be transmitted on a first resource which is a grant-free resource dedicated to transmitting data of a plurality of terminal devices including the first terminal device, wherein the second resource is a resource for transmitting identification information of each of at least one terminal device including the first terminal device, and wherein the second resource does not overlap with the first resource; and transmitting, by the first terminal device, the first data on the first resource;

wherein the second resource is a resource on a random access channel, wherein the identification information of the first terminal device is a dedicated preamble sequence of the first terminal device.

14. The terminal device according to claim 13, comprising at least one of the following:

the first resource is a resource for transmitting data, which is semi-statically configured by a network device for the plurality of terminal devices; and the second resource is a resource for transmitting the identification information of each of the at least one terminal device, which is semi-statically configured by the network device.

15. The terminal device according to claim 13, wherein the method further comprises:

transmitting, by the first terminal device, at least one of a buffer status report (BSR), a resource change request and second data to be transmitted of the first terminal device on the second resource, wherein the resource change request is used to request a network device to adjust a second resource in a next scheduling unit, and wherein data volume of the second data is less than a first threshold.

16. The terminal device according to claim 13, wherein the method further comprises:

receiving, by the first terminal device, indicating information transmitted by a network device, wherein the indicating information indicates size and location of the second resource;

determining, by the first terminal device, the second resource based on the indicating information.

17. The terminal device according to claim 13, wherein the second resource further comprises a resource on a control channel, wherein the identification information of the first terminal device further comprises a scheduling request of the first terminal device, which is used to request a network device to allocate a resource to third data to be transmitted of the first terminal device.

* * * * *